Jan. 20, 1970  R. H. STECKELBERG  3,490,623
WAGON BOX UNLOADING APPARATUS
Filed Jan. 9, 1968  3 Sheets-Sheet 1
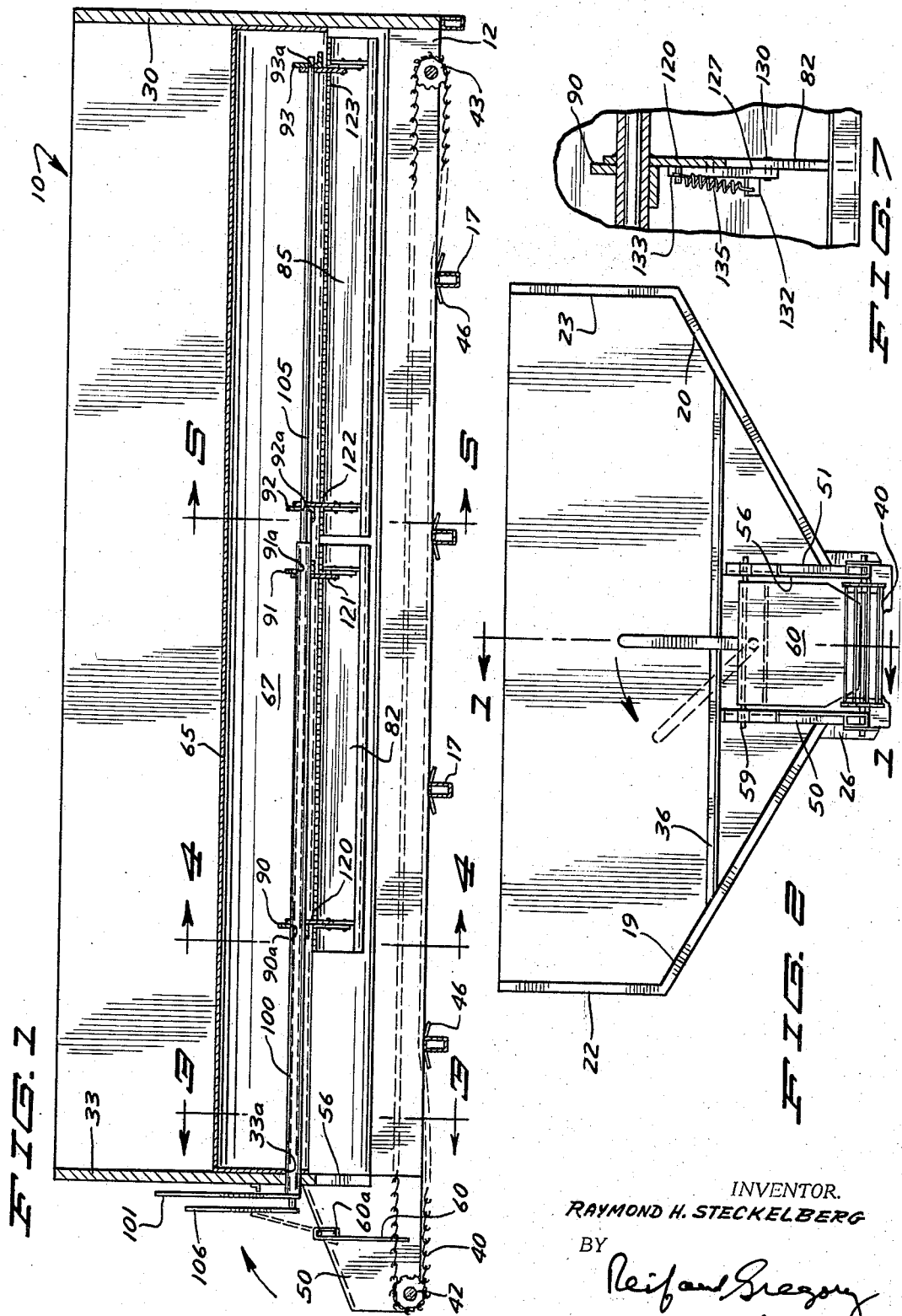
INVENTOR.
RAYMOND H. STECKELBERG
BY
ATTORNEYS Jan. 20, 1970 R. H. STECKELBERG 3,490,623
WAGON BOX UNLOADING APPARATUS
Filed Jan. 9, 1968 3 Sheets-Sheet 2
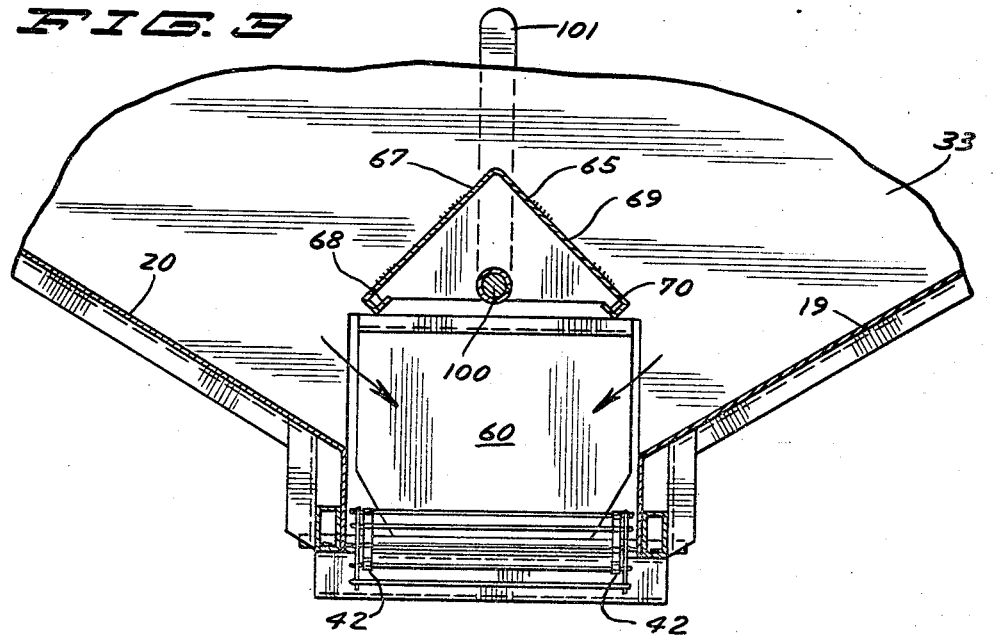
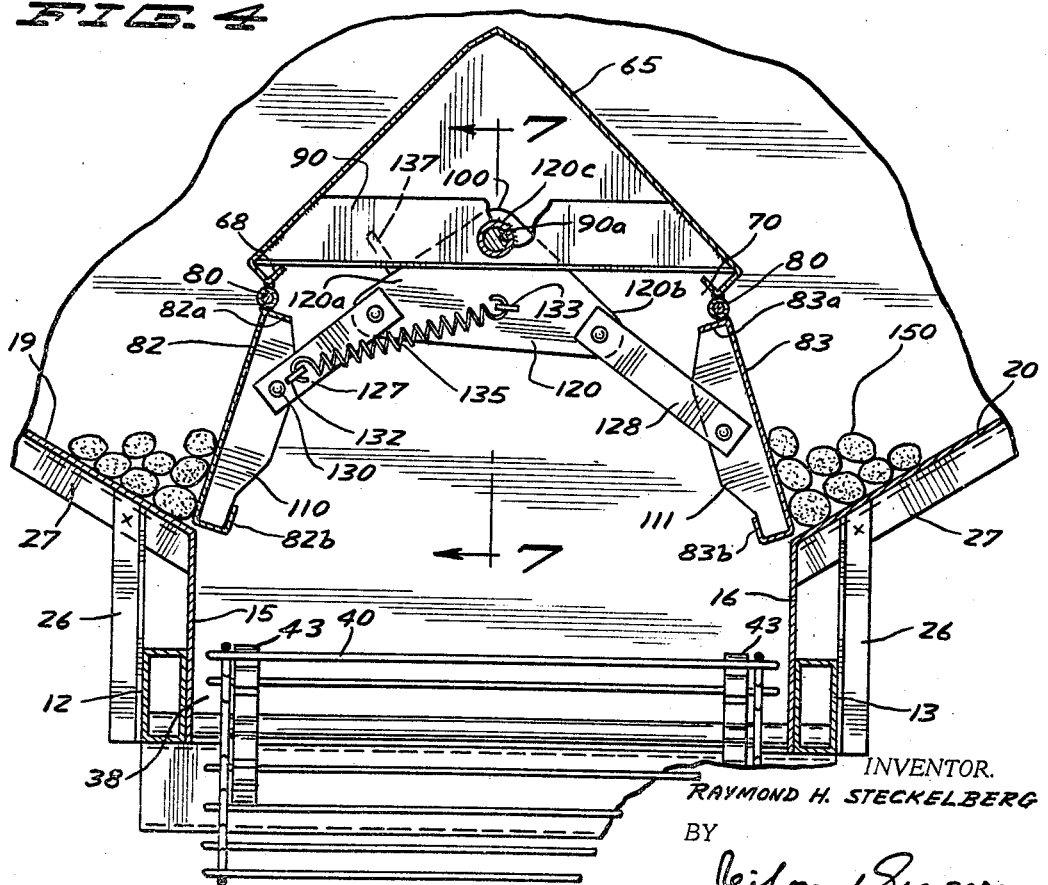
INVENTOR.
RAYMOND H. STECKELBERG
BY
ATTORNEYS Jan. 20, 1970     R. H. STECKELBERG     3,490,623
WAGON BOX UNLOADING APPARATUS
Filed Jan. 9, 1968     3 Sheets-Sheet 3

INVENTOR.
RAYMOND H. STECKELBERG
BY Richard Gregory
ATTORNEY(S)

United States Patent Office 3,490,623
Patented Jan. 20, 1970

3,490,623
WAGON BOX UNLOADING APPARATUS
Raymond H. Steckelberg, Mora, Minn., assignor to Braco, Inc., Braham, Minn., a corporation of Minnesota
Filed Jan. 9, 1968, Ser. No. 696,567
Int. Cl. B60p *1/26*
U.S. Cl. 214—83.2    3 Claims

ABSTRACT OF THE DISCLOSURE

A bulk loading wagon box having lower sloping inner side walls, an opening centrally longitudinally of the bottom of said box, a endless belt underlying said opening, an elevated inverted V-shaped hatch or cover overlying said opening, a plurality of pairs of gates hinged to and depending from either side of said cover respectively being adapted to engage said sloping side walls, linkage connecting opposed pairs of said gates, operating rods extending longitudinally of said cover and rigid with said linkage, said rods and linkage being arranged to independently operate opposed pairs of said gates to retract the same from said side walls as in sequential order, operating means for said rods outwardly of said box and an end gate carried by said box at the discharge end of said opening.

Background and summary of the invention

The invention herein relates to unloading apparatus in connection with a bulk loading box. Customarily such boxes are unloaded by a belt or screw type of conveyor underlying a bottom opening and the entire load within the box is affected as by tumbling when unloading is commenced. In connection with root crops such as potatoes, there is sufficient movement of the goods within the box when unloading is commenced that jamming at the discharge end of the box is not unusual and there results damage to the crop caused by bruising.

With reference to the art which is known, U.S. Letters Patent No. 2,686,693 to Korpela shows the use of an elevated hinged door extending the full length of the box adapted to be pivoted on a central longitudinal axis to open into the bottom of the box. A similar showing is made in U.S. Letters Patent No. 3,148,837 issued to Doolin. In U.S. Letters Patent No. 2,466,923 issued to Woodard, there is shown a central longitudinal hatch or cover which is elevated for unloading purposes.

The above reference material represents the closest art known. The structure comprising the subject matter of the invention herein is clearly distinguishable from what has been indicated. The structure herein provides for an endless conveyor underlying a bottom opening in the box to discharge the goods in the box. Overlying said opening is an elevated cover or hatch comprised of a plurality of pairs of gates hinged at either side of said cover with means being provided to move said gates in successive order to uncover the bottom opening in the direction away from the discharge end of the box. Thus the goods in the box are unloaded in stages which provides an efficient and rapid unloading without any accumulation of goods building up or jamming the discharge opening of the box. It has been found that as a result of unloading in this manner there is very little damage, if any, to the goods being unloaded. Particulr reference is had to root crops.

It is an object of the invention herein to provide an unloading apparatus for a bulk loading wagon box particularly arranged to unload the goods within the box in stages.

It is another object of the invention herein to provide an unloading apparatus for a bulk loading box comprising means partially covering the bottom opening in the box and the unloading conveyor in connection therewith to provide controlled unloading at the discharge end of the box and including a plurality of pairs of gates overlying the bottom opening of the box which may be successively operated to uncover the bottom opening in the box in successive stages in the direction away from the discharge end of the box.

It is more specifically an object of this invention in connection with a bulk loading box having a central longitudinal bottom opening therein to provide an elevated cover for said opening, a plurality of opposed pairs of gates hinged at either side of said cover to engage the respective side walls of said box, linkage connecting pairs of said gates and operating members in connection with said linkage operating pairs of said doors selectively to uncover said bottom opening.

These and other objects and advantages of the invention will be set forth in the following description made in connection with the accompanying drawings in which like reference characters refer to similar parts throughout the several views and in which:

FIG. 1 is a view in vertical longitudinal section taken on line 1—1 of FIG. 2 as indicated;

FIG. 2 is a view in end elevation with a detail thereof in dotted line in alternate position;

FIG. 3 is a broken view on a somewhat enlarged scale in vertical section taken on line 3—3 of FIG. 1 as indicated;

FIG. 4 is a broken view similar to FIG. 3 taken on line 4—4 of FIG. 1 as indicated;

FIG. 7 is a fragmentary view in vertical section taken on line 7—7 of FIG. 4 as indicated and showing a detail of construction.

Description of a preferred embodiment

Figure 5:
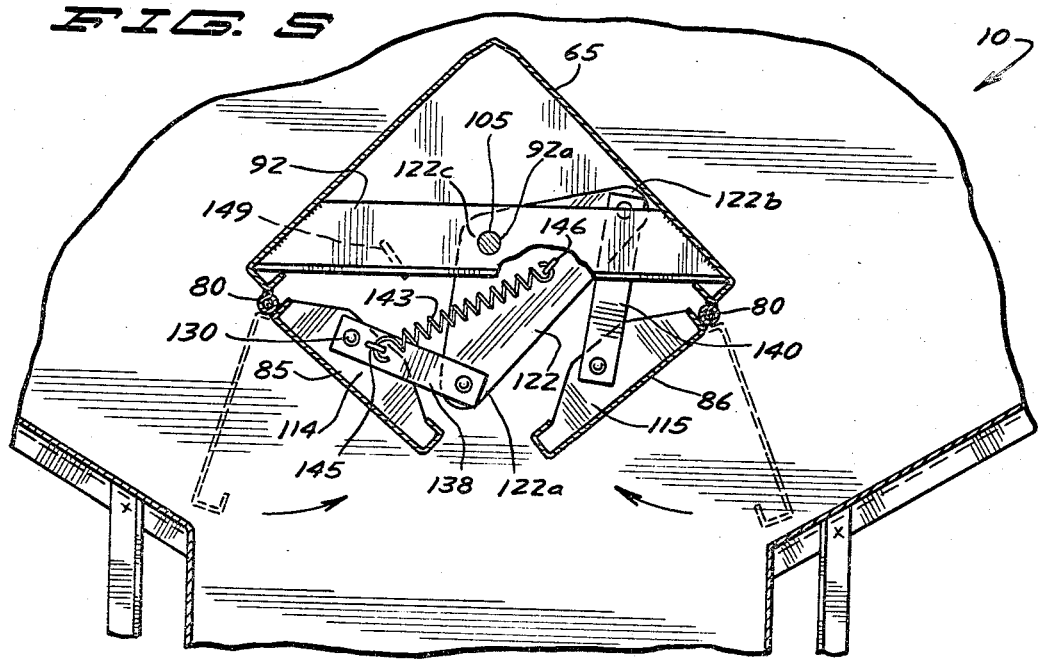
FIG. 5 is a broken view in vertical section similar to FIG. 4 taken on line 5—5 of FIG. 1 as indicated.
Figure 6:
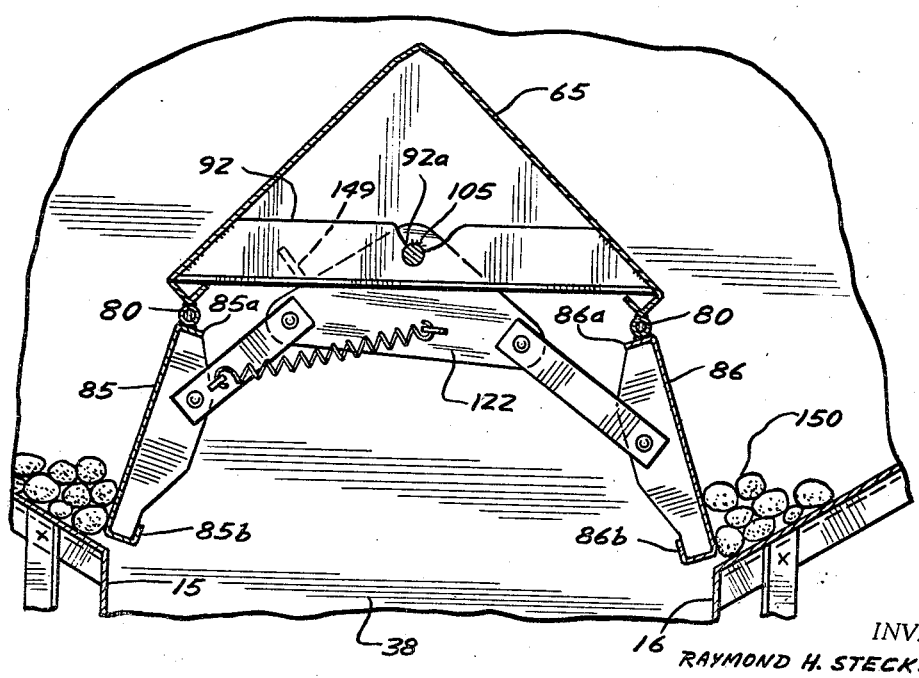
FIG. 6 is a broken view similar to FIG. 5 showing a different operating position.

Referring to the drawings, a bulk loading wagon box of basic conventional construction is indicated generally by the reference numeral 10. Said box is preferably of welded unitary metal construction comprising a pair of laterally spaced centrally disposed longitudinal frame or channel members 12 and 13 having underlying longitudinally spaced transverse channel members 17. A mobile under-carriage support for said box is not shown and is not necessary for a full disclosure of the invention herein.

Welded to the inner or facing sides of said frame members 12 and 13 and upstanding therefrom are side wall members 15 and 16 having upwardly diverging wall portions 19 and 20 respectively terminating in vertical wall portions 22 and 23. Spaced along the outer sides of said frame members 12 and 13 and extending upwardly of said diverging wall portions 19 and 20 are angle members 26, and in connection therewith angle members 27 underlie said diverging wall portions. An end wall 30 overlies the forward end of said box.

And end wall 33 overlies the discharge end of said box. Extending across a lower portion of said end wall is a reinforcing angle member 36.

Between said frame members 12 and 13 is the bottom opening 38 extending the full length of said box. Said frame members 12 and 13 extend outwardly of the discharge end of said box to form a short extension thereof. Side wall extensions 50 and 51 are provided at either outer side of the extended portions of said frame members 12 and 13 to form a discharge chute.

And endless conveyor 40, such as the link belt conveyor indicated, passes over pairs of sprockets 42 and 43 mounted between said frame members 12 and 13. Suitable power means will drive the sprocket 43. Idlers 46 supporting the lower run of said belt are merely indicated. Conventional supports may be provided for the upper run of said belt but are not here indicated.

Said end wall 33 has an opening 56 to provide a discharge opening in connection with the conveyor 40. A gate 60 is pivoted between said side walls 50 and 51 by a rod 59 spaced somewhat outwardly of said end wall 33. The lower end portion 61 of said gate is narrowed to be disposed between adjacent links of said conveyor 40 to hold said gate in locked position. Said gate 60 has a slot 60a of some depth through which said rod 59 passes whereby said gate may be raised upwardly free of said conveyor 40 and tilted upwardly in the direction of the box, as indicated in FIG. 1, to be placed in open position.

The apparatus in connection with said box 10 comprising the subject matter of the invention herein will now be described.

Extending the full length of the interior of said box 10 elevated over the bottom opening 38 is an inverted V-shaped hatch or cover 65 welded to the inner sides of the end walls 30 and 33. The ends of said cover may be flanged if it is desired to bolt the ends of said cover to said end walls. Said cover comprises walls 67 and 69 which have ends 68 and 70 angled inwardly to form channels.

Hinged at either side of said cover to the lower ends of the side walls thereof are opposed or transverse longitudinally aligned pairs of substantially flat rectangular gates 82–83 and 85–86. Said gates have angled upper ends 82a–83a and 85a–86a and particularly for rigidity have inwardly angled lower ends 82b–83b and 85b–86b forming channels. Said gates will be respectively hinged to the side walls of said cover 65 by suitable conventional type piano hinges 80. The gates respectively have a width such that when extended they come sufficiently close to the lower ends of said walls 19 and 20 to prevent the goods within the box from passing therebetween onto the conveyor 40.

Said first pair of gates 82–83 will be spaced inwardly of said end wall 33, as indicated in FIG. 1.

It is within the scope of the invention herein to provide more than one pair of gates. The structure shown is illustrative of the invention.

Extending across or bridging the lower ends of said cover 65 and extending upwardly inwardly thereof adjacent each end of said pairs of gates are angled plate members 90–93 respectively having central aligned circular apertures 90a–93a of which 92a and 93a may be somewhat smaller, as will be described. The end wall 33 has an aperture 33a therein aligned with said apertures 90a–93a.

A tubular operating rod 100 extends through the aperture 33a, 90a and 91a to the forward ends of the gates 82 and 83. Said rod will rotate freely within said apertures. Said rod 100 is provided with an operating handle 101 secured to an outward extension thereof spaced somewhat outwardly of the end wall 33.

Extending through said tubular rod 100 as to be rotatable therein and extending through the apertures 92a and 93a as to be rotatable therein is an operating rod 105. Said rod 105 is provided with on operating handle 106 which as shown in FIG. 1 is positioned outwardly of said handle 101. Thus said rods 100 and 105 are rotatable separately.

Adjacent the respective ends of said gates inwardly of said plate members 90–93 and extending inwardly of the side walls thereof at right angles thereto are opposed pairs of plate members forming flanges of which plate members 110 and 111 are shown with respect to gates 82 and 83, and plate members 114 and 115 are shown with respect to gates 85 and 86.

Respectively in alignment with said opposed pairs of flange plate members are triangular plate members 120–123 comprising links. Said triangular plate members are apertured at their apexes as at 120c and 122c with respect to the plate members 120 and 121. The plate members 120 and 121 have the tubular rod 100 disposed through their respective apertures and the plate members 122 and 123 have the rod 105 disposed through their respective apertures. Said plate members with said rods will be rigid with one another as by being welded together.

With respect to the discharge ends of the gates 82 and 83, as shown in FIG. 4, flat plate-like link members 127 and 128 are provided. The link 127 is somewhat shorter than the link 128. The lower end of the link 127 is pivoted to the flange 110 at an upper central point thereon, and the link 128 has its lower end pivoted to a lower central point of the flange 111. The upper ends of said links will be pivoted to the adjacent leg portions 120a and 120b respectively of the plate member 120. Said links will be pivotally secured as by rivets 130. A small tongue 132 is struck from a lower portion of the link 127 and a tongue 133 is struck from a central portion of the plate member 120. A coil spring 135 having sufficient tension will have its respective ends secured to said tongues 132 and 133. A stud 137 extends inwardly of the plate member 90 to form a stop member with respect to the plate member 120 with regard to its movement upwardly to the left with respect to its direction of movement, as shown in FIG. 4.

The end portions of the gates 82 and 83 remote from those as described and as shown in FIG. 4, will have in connection therewith identical structural elements.

With reference to FIG. 5, the triangular plate member 122 is rigid with the rod 105 at its apertured apex 122c. Link members 138 and 140 identical to links 127 and 128 will in like manner pivotally connect the flanges 114 and 115 of the gates 85 and 86 with the adjacent leg portions 122a and 122b of the plate member 122 by rivets 130. Coil spring 143 will connect the link 138 and the plate member 122 by means of tongues 145 and 146 respectively struck from said link 138 and said plate member 122 as illustrated. A stop member 149 in the form of a stud extends inwardly of the cross plate member 92 with respect to the plate member 122.

The end portions of the gates 85 and 86 remote from those shown and described in FIG. 5 will have in connection therewith identical structural elements.

The reference numeral 150 indicates a root crop such as potatoes, which would normally be carried in the box 10.

Operation

For the purpose of loading the box 10, the gate 60 will be in closed position, as shown in FIGS. 2 and 3. The gates 82–83 and 85–86 will be lowered, as indicated in FIG. 4, to have substantial engagement with the lower end portions of the diverging side walls 19 and 20. The clearance between the ends of the gates and the adjacent side walls need only be such as to prevent the passage therebetween of the crop being carried. The coil spring 135 and 143 hold their respective gates in closed position by placing tension on the lower portions of the links 127 and 138 causing the plate members 120 and 122 to bear against the stop members 137 and 149, and the upper pivot points of said links are in above or off center positions.

With the wagon box 10 loaded with the crop, such as a crop of potatoes 150, the portion of the load rearwardly of the gates 82 and 83 will fill up the space in the box between the ends of said gates and the discharge end of the box.

To unload the box, the gate 60 will be raised out of engagement with the conveyor 40 and it will be tilted upwardly and rearwardly, as shown in FIG. 1. Operating means will then ben energized to drive the conveyor 40 to discharge or unload the crop. The crop at the discharge end of the conveyor will move first. The rest of the crop in the box will be relatively undisturbed. Next, the operating handle 101 will be turned to the left with respect to a position facing the outer side of the discharge end of the box. Thus the plate members 120 and 121 with respect to the gates 82 and 83 will be rotated upwardly to the right in a manner as indicated in FIG. 5, with respect to gates 85 and 86, causing the gates 82 and 83 to retract or to swing inwardly and upwardly. Said gates are thus placed in open position and are held in this position by the tension of the spring 135 on the link 127. A companion spring not shown will also be holding said gates at their other ends.

Thus with the gates 82 and 83 retracted into open position, the potatoes which were supported upon said gates will move downwardly onto the conveyor 40 to be discharged from the box. It will be understood that some of the crop above the gates 85 and 86 will move downwardly onto the unloading conveyor.

To unload the remainder of the goods in the box, the operating lever 106 will be moved in the same manner as the operating lever 101 and the gates 85 and 86 will be retracted to open position, as shown in FIG. 5, and as described in connection with gates 82 and 83. The remainder of the crop in the box will move down onto the conveyor 40 to be discharged. Thus it is seen that the crop within the box is unloaded in stages such that there is a minimum amount of disturbance to the crop not being directly unloaded, and it has been shown that there is very little damage, if any, to the crop.

When the lever 101 is moved to swing the gates 82 and 83 to retracted position, the tubular member 100 which is rigid with the plate members 120 and 121, swings said plate members upwardly to the right, as viewed in FIG. 4, without disturbing the operating rod 105. The handle 106 rotates the rod 105 freely within the tubular operating member 100 for operation of the gates 85 and 86. It is seen that gates 82–83 and gates 85–86 are each operated separately and are retractable independently of each other. The operator may selectively unload the portion of the crop suported by the gates 82–83 and the portion of the crop supported by gates 85–86.

Thus it is seen that the invention herein comprises a simple and efficient structure for controlling the discharge of crop from a bulk loading box to unload the same in stages or to selectively unload the same as desired.

It will of course be understood that various changes may be made in the form, details, arrangement and proportions of the parts without departing from the scope of the invention.

What is claimed is:

1. An unloading apparatus in connection with a bulk loading wagon box having end walls, sloping side wall portions and a central longitudinal bottom opening having an underlying endless conveyor, having in combination, an elevated cover overlying said opening, an opposed pair of gates hinged to opposite sides of said cover and depending therefrom.

said gates extending sufficiently close to said side wall portions to prevent passage of goods therebetween, each of said gates having spaced links pivoted thereto, opposed pairs of said links being transversely aligned, a triangular plate member with each opposed pair of said links respectively having said links pivoted to opposed leg portions thereof, a rod with respect to said gates disposed longitudinally of said cover, interior cross frame members carried by said cover supporting said rod, said rod being disposed through the apex of and being rigid with said plate members at right angles to the planes thereof, and a handle in connection with said rod outwardly of said box rotating said rod and moving said triangular plate member to define an arc radially of said rod swinging said gates inwardly of said cover to open position.

2. The structure set forth in claim 1, including means carried by said cover limiting the movement of said plate members to a given position with said links and said gates in extended closing position.

3. The structure set forth in claim 1, including means holding said gates in open position.

References Cited

UNITED STATES PATENTS

| | | | |
|---|---|---|---|
| 2,586,279 | 2/1952 | White | 214—83.2 |
| 2,601,608 | 6/1952 | Hansen | 222—413 |
| 2,614,708 | 10/1952 | Hoffstetter | 214—83.2 XR |
| 2,776,078 | 1/1957 | Raynor | 222—413 |
| 3,356,270 | 12/1967 | Heider | 214—83.2 XR |

FOREIGN PATENTS 749,203  5/1956  Great Britain.

ALBERT J. MAKAY, Primary Examiner